(12) United States Patent
Osborne et al.

(10) Patent No.: US 9,837,878 B2
(45) Date of Patent: Dec. 5, 2017

(54) ELECTROMAGNETIC INTERFERENCE (EMI) SUPPRESSION IN A POWER TOOL

(71) Applicant: Black & Decker Inc., Newark, DE (US)

(72) Inventors: Stephen P. Osborne, Pikesville, MD (US); Ahmed S. Shaik, Windsor Mill, MD (US); Richard T. Walter, Baldwin, MD (US); Colin Crosby, Baltimore, MD (US); Kevin Cox, Owings Mills, MD (US)

(73) Assignee: Black & Decker Inc., New Britain, CT (US)

( * ) Notice: Subject to any disclaimer, the term of this patent is extended or adjusted under 35 U.S.C. 154(b) by 643 days.

(21) Appl. No.: 14/254,084

(22) Filed: Apr. 16, 2014

(65) Prior Publication Data

US 2015/0303777 A1    Oct. 22, 2015

(51) Int. Cl.
*H02K 11/02* (2016.01)
*H02K 11/026* (2016.01)

(52) U.S. Cl.
CPC ................... *H02K 11/026* (2013.01)

(58) Field of Classification Search
CPC ..... H02K 11/02; H02K 11/024; H02K 11/026
USPC .................................................. 310/238–239
See application file for complete search history.

(56) References Cited

U.S. PATENT DOCUMENTS

| 3,924,147 | A | * | 12/1975 | Tarnow ............... H02K 11/026 310/239 |
| 4,145,674 | A | * | 3/1979 | King ....................... H04B 3/28 307/105 |
| 4,677,329 | A | * | 6/1987 | Secoura ................. H02K 3/522 310/71 |
| 4,983,932 | A | | 1/1991 | Kitagawa |
| 5,477,154 | A | | 12/1995 | Takahashi et al. |
| 5,896,079 | A | | 4/1999 | Parker |
| 5,990,756 | A | | 11/1999 | France, Jr. et al. |
| 6,160,466 | A | | 12/2000 | Kawai |
| 6,400,058 | B1 | * | 6/2002 | Liau ..................... H02K 11/026 310/239 |
| 7,291,957 | B2 | | 11/2007 | Simofi-Illyes et al. |
| 8,084,901 | B2 | | 12/2011 | Oomori et al. |
| 2004/0056540 | A1 | | 3/2004 | Kraenzler et al. |

(Continued)

FOREIGN PATENT DOCUMENTS

| DE | 1895208 | 6/1964 |
| DE | 1813340 | 6/1970 |

(Continued)

*Primary Examiner* — Burton Mullins
(74) *Attorney, Agent, or Firm* — Amir R. Rohani

(57) ABSTRACT

A power tool is provided including a housing and an electric motor disposed within the housing, where the electric motor includes a stator and an armature rotatably received within the stator, and the armature includes an armature shaft on which a commutator is mounted. The power tool includes a brush assembly disposed around the commutator. The brush assembly includes at least two brushes in contact with the commutator and a circuit board mounted on the brush assembly and in electrical contact with the brushes. The circuit board includes at least one electromagnetic interference (EMI) suppression component electrically mounted thereon, the EMI suppression component being electrically coupled to the brushes.

6 Claims, 11 Drawing Sheets

(56) References Cited

U.S. PATENT DOCUMENTS

| | | | | |
|---|---|---|---|---|
| 2007/0210672 A1* | 9/2007 | Fleminger | ............ | H01R 39/385 310/239 |
| 2011/0018377 A1* | 1/2011 | Zhao | .................... | H02K 11/024 310/72 |
| 2012/0292067 A1* | 11/2012 | Velderman | ................ | B25F 5/00 173/170 |
| 2013/0307380 A1* | 11/2013 | Zeng | .................... | H02K 11/026 310/68 R |

FOREIGN PATENT DOCUMENTS

| | | | | |
|---|---|---|---|---|
| DE | 2042342 | | 11/1971 | |
| DE | 8200798 | | 6/1982 | |
| DE | 4422986 | | 1/1995 | |
| DE | 4410980 | | 10/1995 | |
| DE | 19537882 | | 4/1996 | |
| DE | 19852251 | * | 3/2000 | ............. H02K 11/02 |
| DE | 29821736 | | 4/2000 | |
| DE | 29912921 | | 8/2000 | |
| EP | 0075220 | | 3/1983 | |
| EP | 1750368 | | 2/2007 | |
| EP | 1750368 A1 | | 7/2007 | |
| WO | 03036779 | | 5/2003 | |

* cited by examiner

ELECTROMAGNETIC INTERFERENCE (EMI) SUPPRESSION IN A POWER TOOL

FIELD OF THE INVENTION

The present invention relates to power tools, and more particularly to a method and system for suppression of Electromagnetic Interference (EMI) in power tools.

BACKGROUND

Electromagnetic Interference (EMI) is disturbance that affects an electrical circuit due to either electromagnetic induction or electromagnetic radiation emitted from an external source. In power tools, EMI can be radiated by motor terminals, lead wires, and brushes. In particular, in brushed motors, where commutation of the armature is accomplished as a result of contact between the brushes and the commutator bars, EMI can be substantial. In brushed motors, as contact is made and broken during commutation, the energy in the windings has to dissipate due to the abrupt changes in the windings' current. This energy is then coupled with nearby wires and other metal parts, which act as antennae (depending on the frequency) to radiate the electromagnetic energy. This energy may cause electromagnetic interference with other components in the vicinity of the power tool.

Various EMI suppression components (hereinafter also referred to as "EMI components") may be utilized to reduce the EMI generated by power tool motor components. Capacitors are exemplary components used as EMI components. The challenge faced by power tool design engineers is how to use the smallest and/or least amount of EMI components effectively to meet the regulatory EMI requirements. The contact between the motor commutator and brushes typically generate the most EMI, but mounting the EMI suppression components in the vicinity of the motor commutator and the brushes is often challenging. Moreover, EMI components need to be properly grounded to reduce emissions. In framed motors where the motor is contained inside a metallic housing, the EMI components may be grounded to the motor frame. In frameless motors, however, proper grounding of the EMI components presents additional challenges. What is needed is a cost and space effective EMI suppression mechanism in a power tool.

SUMMARY

According to an aspect of the invention, a power tool is provided including a housing and an electric motor disposed within the housing, where the electric motor includes a stator and an armature rotatably received within the stator, and the armature includes an armature shaft on which a commutator is mounted. In an embodiment, the power tool includes a brush assembly disposed around the commutator, the brush assembly including at least two brushes in contact with the commutator and a circuit board mounted on the brush assembly and in electrical contact with the brushes. In an embodiment, the circuit board includes at least one electromagnetic interference (EMI) suppression component electrically mounted thereon, the EMI suppression component being electrically coupled to the brushes.

In an embodiment, the EMI suppression component(s) include an X capacitor having terminals electrically coupled to the two brushes and two Y capacitors having first terminals electrically coupled to the two brushes and second terminals electrically coupled to a point of substantially zero potential. In an embodiment, one end of the armature shaft is housed within a rear bearing and the second terminals of the Y capacitors are electrically coupled to the rear bearing so as to ground the Y capacitors to the armature.

In an embodiment, the brush assembly includes a brush card including a through-hole in which the commutator is disposed, the brush card providing a mounting surface for the brush assembly.

In an embodiment, the brush assembly includes a pair of spring arms extending around the commutator, the brushes being attached to a first end of the spring arms, the second end of each spring arm including an electrically conductive post to which the circuit board is secured, the posts providing electrical connection between the EMI suppression component and the spring arms.

In an embodiment, the brush assembly includes a pair of brush holders housing the brushes, the brush holders including an electrically conductive post to which the circuit board is secured, the posts providing electrical connection between the EMI suppression component and the brush holders.

According to another aspect of the invention, a power tool is provided including a housing and an electric motor disposed within the housing, where the electric motor includes a stator and an armature rotatably received within the stator, and the armature includes an armature shaft on which a commutator is mounted. In an embodiment, the power tool includes a brush assembly disposed around the commutator, the brush assembly including at least two brushes in contact with the commutator. In an embodiment, the power tool further includes at least one electromagnetic interference (EMI) suppression component having a first terminal electrically coupled to one of the brushes and second terminal electrically coupled to a point of substantially zero potential. In an embodiment, one end of the armature shaft is housed within a rear bearing and the second terminal of the EMI suppression component is electrically coupled to the rear bearing so as to provide the armature as the point of substantially zero potential for the EMI suppression component.

In an embodiment, the EMI suppression component(s) include two Y capacitors coupled between the brushes and the armature, the power tool also including an X capacitor electrically coupled between the two brushes.

In an embodiment, the EMI suppression component is mounted on a circuit board and the brush assembly includes a pair of posts to which the circuit board is secured, the posts providing electrical connection between the EMI suppression component and the brushes.

In an alternative embodiment, the EMI suppression component is secured to the housing.

In yet another embodiment, the tool includes a rear bearing retainer secured to the housing, the rear bearing retainer securely retaining the rear bearing therein. The at least one EMI suppression component is attached to the rear bearing retainer. In a further embodiment, the EMI suppression component is secured to the rear bearing retainer via an adhesive, heat-staked to the rear bearing retainer, or pushed into a slot provided in the rear bearing retainer. In an embodiment, the rear bearing retainer is either an integral part of the housing or is separately provided and secured to the housing.

According to another aspect of the invention, a power tool is provided including a housing and an electric motor disposed within the housing, where the electric motor includes a stator and an armature rotatably received within the stator, and the armature includes an armature shaft on which a commutator is mounted. In an embodiment, the power tool includes a brush assembly disposed around the commutator, the brush assembly including at least two brushes in contact with the commutator; a bearing retainer assembly disposed adjacent the brush assembly to retain an end bearing of the armature shaft; and at least one electromagnetic interference (EMI) suppression component secured to the bearing retainer assembly and electrically coupled to at least one of the brushes.

In an embodiment, the bearing retainer assembly includes metal routings thereon for connecting the EMI suppression component to at least one of the brushes. In an embodiment, the brush assembly includes two brush holders housing the two brushes and the bearing retainer assembly includes two walls extending along the brush holders, wherein the metal routings extend from a first side of the wall, where they are in contact with the brush holders, to a second side of the wall, where they are connected to one or more EMI suppression component. In an alternative embodiment, the metal routings extend from one or more EMI suppression component to the brush holder mounts.

In an embodiment, the EMI suppression component(s) include an X capacitor having terminals electrically coupled to the two brushes and two Y capacitors having first terminals electrically coupled to the two brushes and second terminals electrically coupled to a point of substantially zero potential. In an embodiment, the bearing retainer assembly includes metal routings thereon for connecting the X capacitor to the brushes, the first terminal of the Y capacitor to the brushes, and second terminal of the Y capacitors to the end bearing of the armature shaft.

DETAILED DESCRIPTION

An EMI suppression system incorporated into a power tool is herein discussed according to a various embodiments of the invention. The EMI suppression system of the present invention may be incorporated into various power tools, both cordless and corded. As an example of a power tool that can be used with the EMI suppression system of the invention, reference is made to US Patent Publication No. 2013/0313924 filed Mar. 15, 2013 assigned to Black & Decker (US) Inc., which is incorporated by reference in its entirety.

Figure 1A:
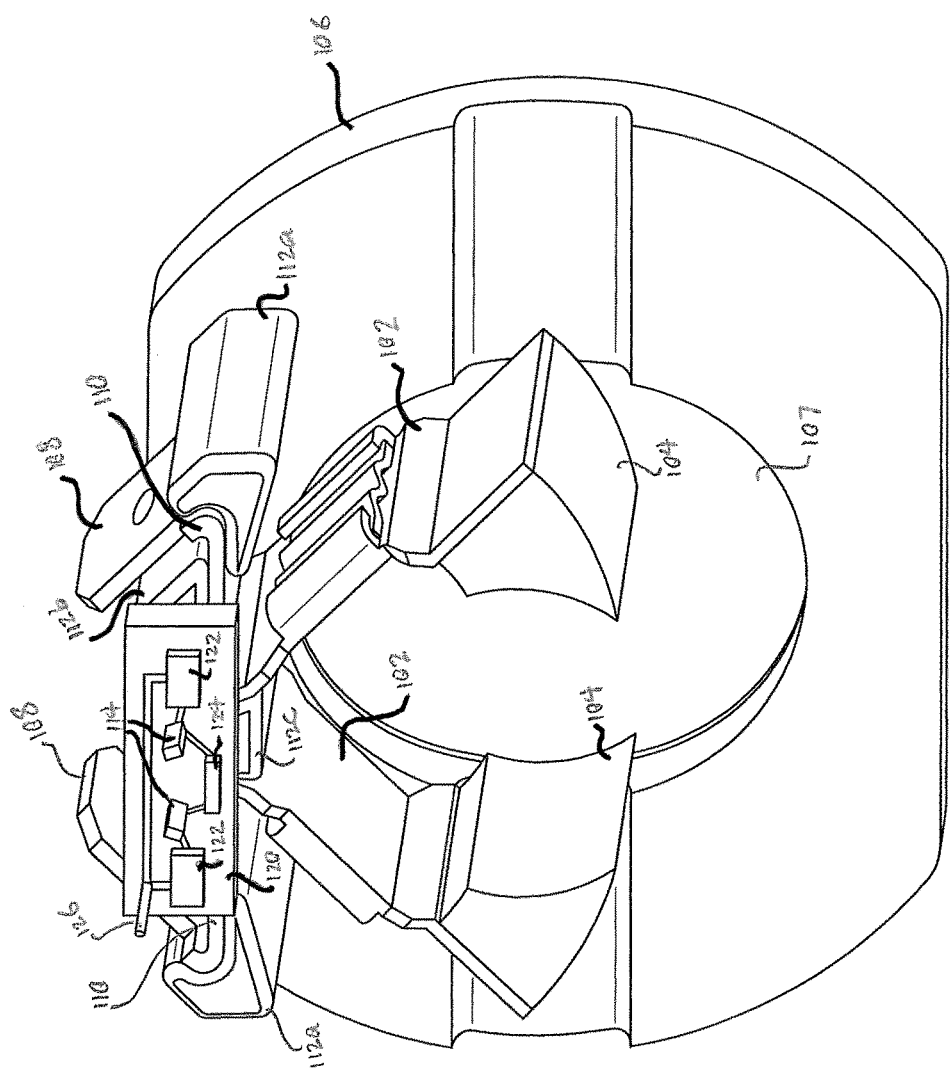
FIG. 1A depicts a brush card incorporating EMI suppression components (hereinafter referred to as EMI components), according to an embodiment.

Referring to FIG. 1A, according to an aspect of the invention, EMI components are provided on a printed circuit board (PCB) in the vicinity of the contact point between the motor brushes and the commutator, according to an embodiment. According to one embodiment, EMI components 122, 124 may be mounted on a PCB 120 secured to a spring arm brush system. In an embodiment, EMI components may include two Y capacitors 122 and an X capacitor 124. X and Y capacitors that, when configured properly, suppress electrical noise by preventing the tool from sending and receiving electromagnetic and radio frequency interference. In an embodiment, X capacitor 124 is connected to motor brushes 104 to effectively check symmetrical interference. In an embodiment, Y capacitors 122 are connected in a line bypass, i.e., between the line phase of the motor brushes and a point of zero potential, to keep out asymmetrical interference.

According to an embodiment, the spring arm brush system shown herein includes spring arms 102 that support and bias brushes 104 towards a commutator (not shown). Spring arms 102 are connected via terminal connectors 110 to motor terminals 108. Motor terminals 108 are coupled via controlled power switches (not shown), such as triacs, FETs, or IGBTs, to a power source to provide electric energy to activate the brushes 104.

In an embodiment, the spring arm brush system of the invention is secured to a brush card (or brush mount) 106. Brush card 106, in an embodiment, includes projections 112a and 112b that provide channels in which terminals connectors 110 and motor terminals 108 are securely inserted.

According to an embodiment of the invention, two pins 114 are provided on spring arms 102 or terminal connectors 110. Pins 114 project outwardly to provide a mounting mechanism for PCB 120. Pins 114 may be provided on any of these components: motor terminals 108, terminal connectors 110, spring arms 102, brush card 106, and/or brush card projections 112a, 112b, etc. Pins 114 are fitted into two through-holes provided in PCB 120 to hold PCB 120 firmly over or in between motor terminals 108 and in the vicinity of the brushes 104. Also, pins 114 provide electrical connectivity to couple EMI component 122, 124 mounted on PCB 120, brushes 104 and motor terminals 108. In an embodiment, pins 114 are electrically connected between the end terminals of X capacitor 124 and first respective terminals the Y capacitors 122. In an embodiment, second terminals of the Y capacitors 122 are coupled together and connected to a connector (e.g., welded wire, a pin, etc.) 126. Connector 126 is electrically connected to a large metal body to substantially ground the Y capacitors 122.

Figure 1B:
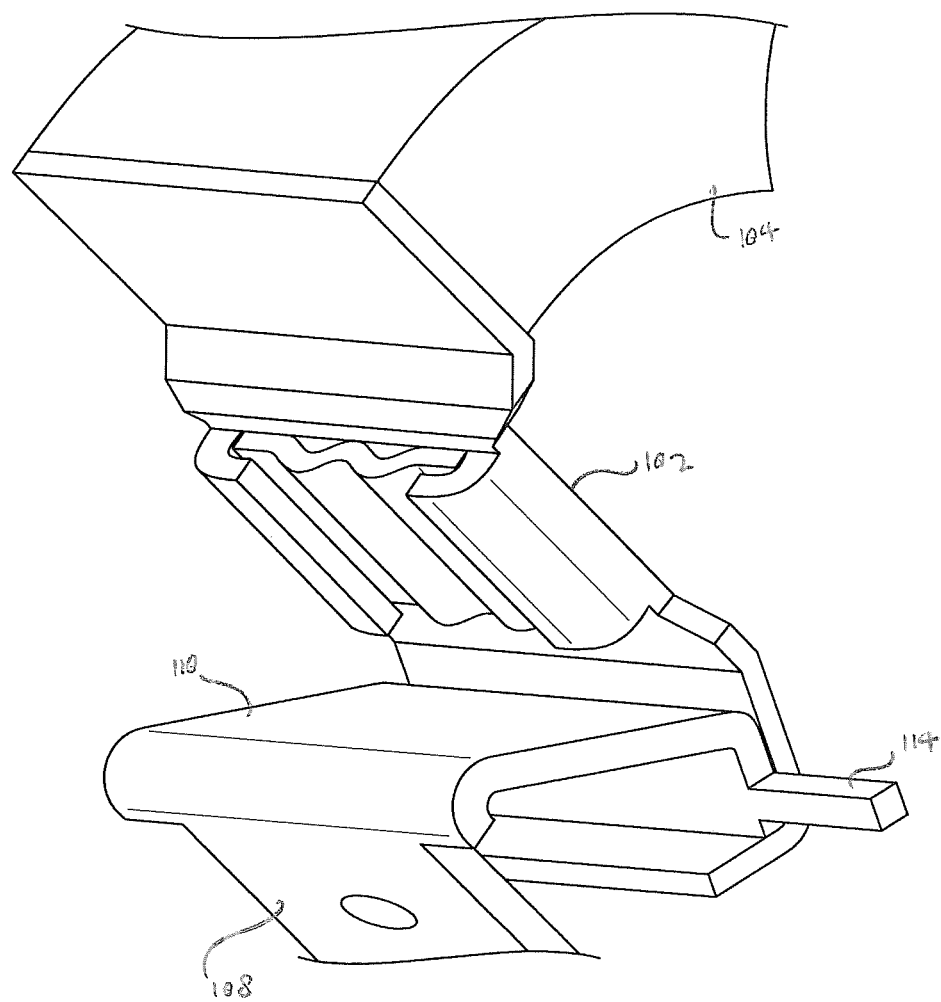
FIG. 1B depicts an exemplary spring arm of the brush card of FIG. 1A, according to an embodiment.

FIG. 1B provides an exemplary view of a spring arm 102, according to an embodiment. As shown in this embodiment, pin 114 is formed integrally as a part of terminal connector 110 and projects from an end of terminal connector 110 adjacent to spring arm 102. As discussed above, pin 114 may alternatively be provided on spring arm 102 or motor terminal 108. Additionally, terminal connector 110, motor terminal 108 and spring arm 102 may be individually or separably integrally formed.

Figure 2:
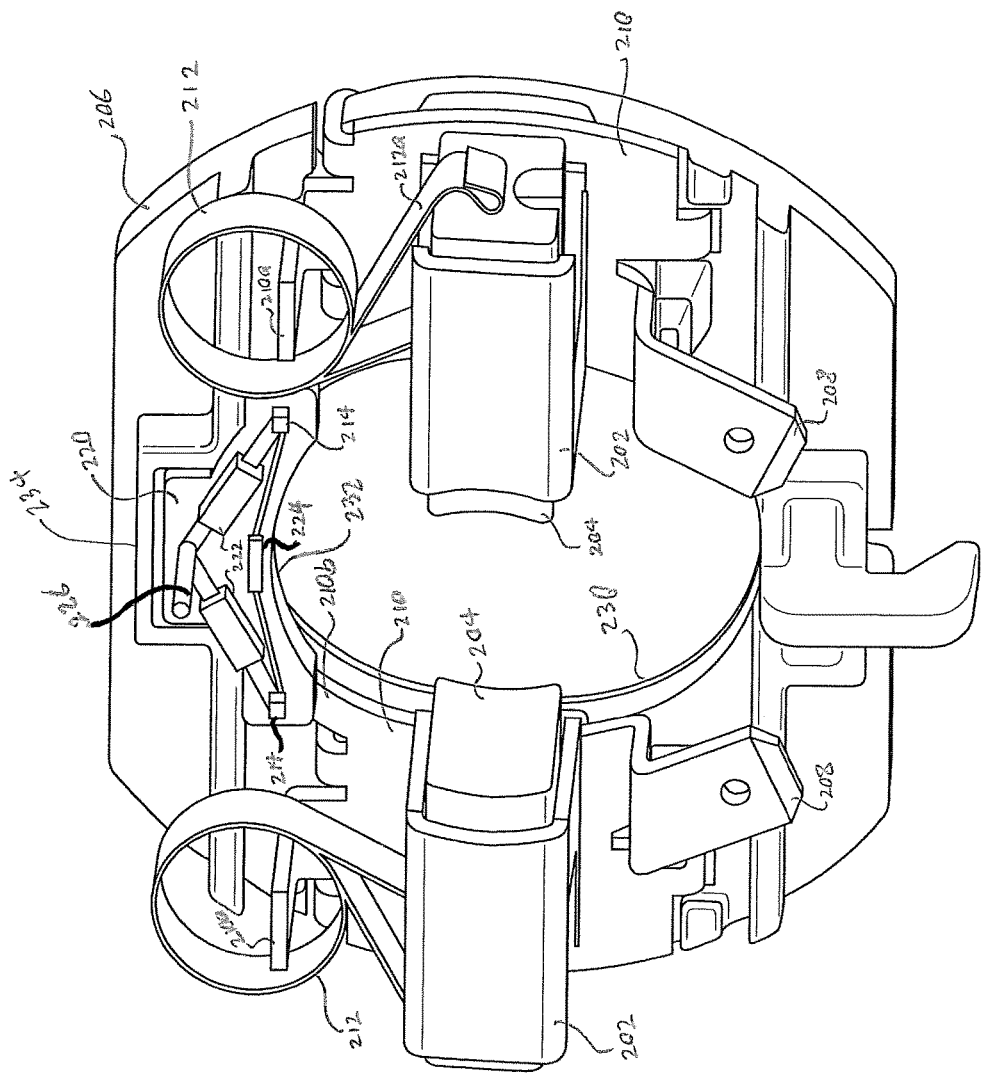
FIG. 2 depicts a brush card incorporating EMI components, according to an alternative embodiment.

FIG. 2 depicts a brush card 206 incorporating EMI components, according to an alternative embodiment. In this embodiment, brush card 206 is provided with two brush holder mounts 210 attached thereto opposite one another. Brush holders 202 include legs that penetrate corresponding holes in brush card 206 and fold on the opposite surface of brush card 206 to securely hold brush holders 202. Brush holders 202 are attached, separately or integrally, to brush holder mounts 210. A pair of clock springs 212 are provided on posts 210a of brush holder mounts 210 adjacent the brush holders 202. Springs 212 engage a back side of brushes 204 to bias brushes 204 towards the commutator (not shown). Brush holders 210 include motor terminals 208 for electrically coupling brushes 204 to a controlled power supply.

According to the embodiment of FIG. 2, brush holders 210 are provided with two upwardly-projecting pins 214. In an exemplary embodiment, each brush holder 210 includes an extended portion 210b provided adjacent a leg of the brush holder 201 near posts 210a. Pins 214 are provided at distal ends of extended portions 210b opposite terminals 208. PCB 220 includes two through-holes near its two ends into which pins 214 are securely fitted. PCB 220 in this embodiment is arranged between springs 212 and around inner circumference 232 of brush card 206. PCB 220 may include a curved portion 232 that aligns with inner circumference 232 so it does not interfere with the commutator (not shown) disposed within brush card 206. The length of PCB 220 may extend beyond the distance between the two pins 214. In an embodiment, brush card 206 further includes a wall 234 shaped to partially house PCB 220.

It is noted that similarly to FIG. 1A, PCB 220 includes EMI components including two Y capacitors 222 electrically connected between pins 214 and a point of zero potential. Pins 214 are in turn connected to motor brushes 204. PCB 220 also includes an X capacitor 224 electrically connected inline between the pins 214.

Figure 3:
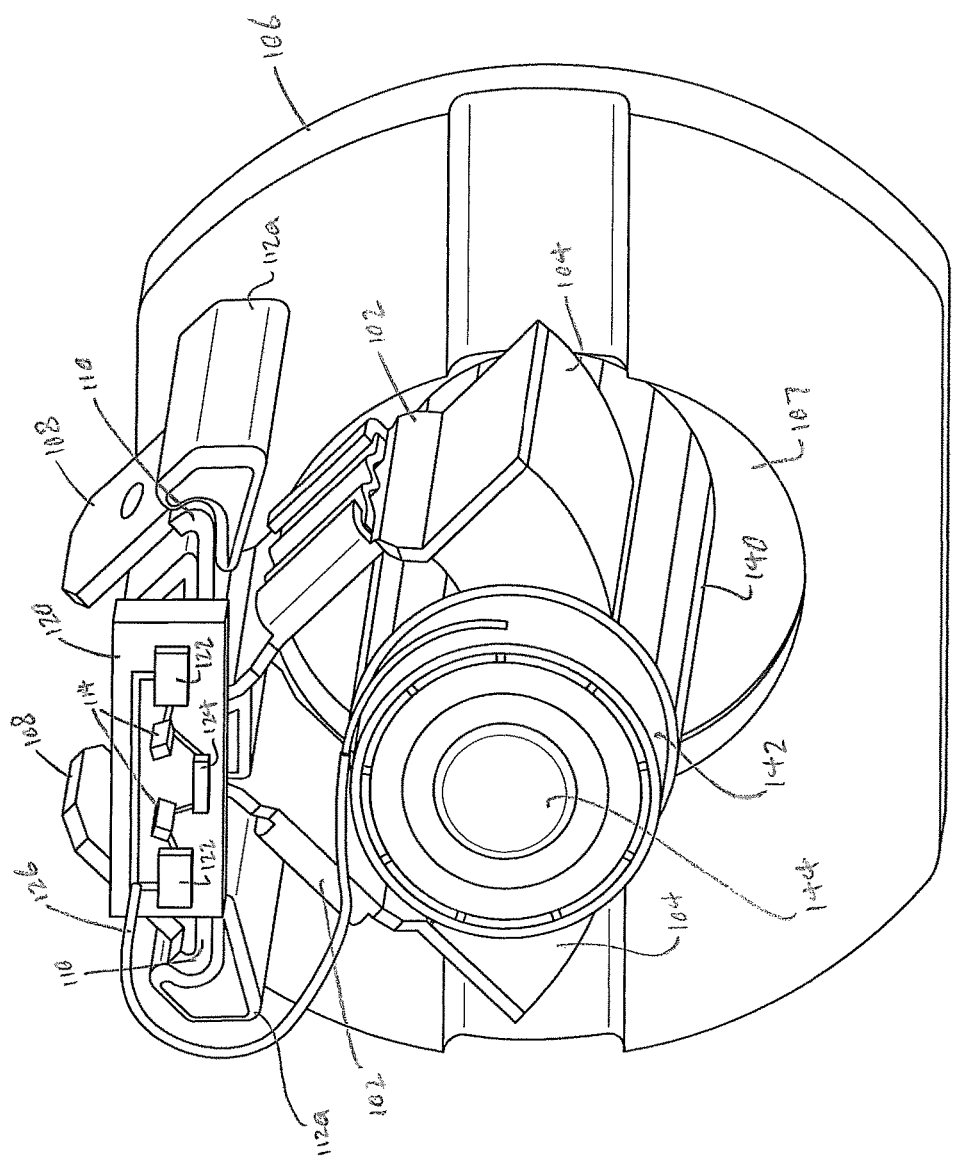
FIG. 3 depicts the brush card of FIG. 1A with the EMI components coupled to the rear bearing of the armature assembly, according to an embodiment.
Figure 4:
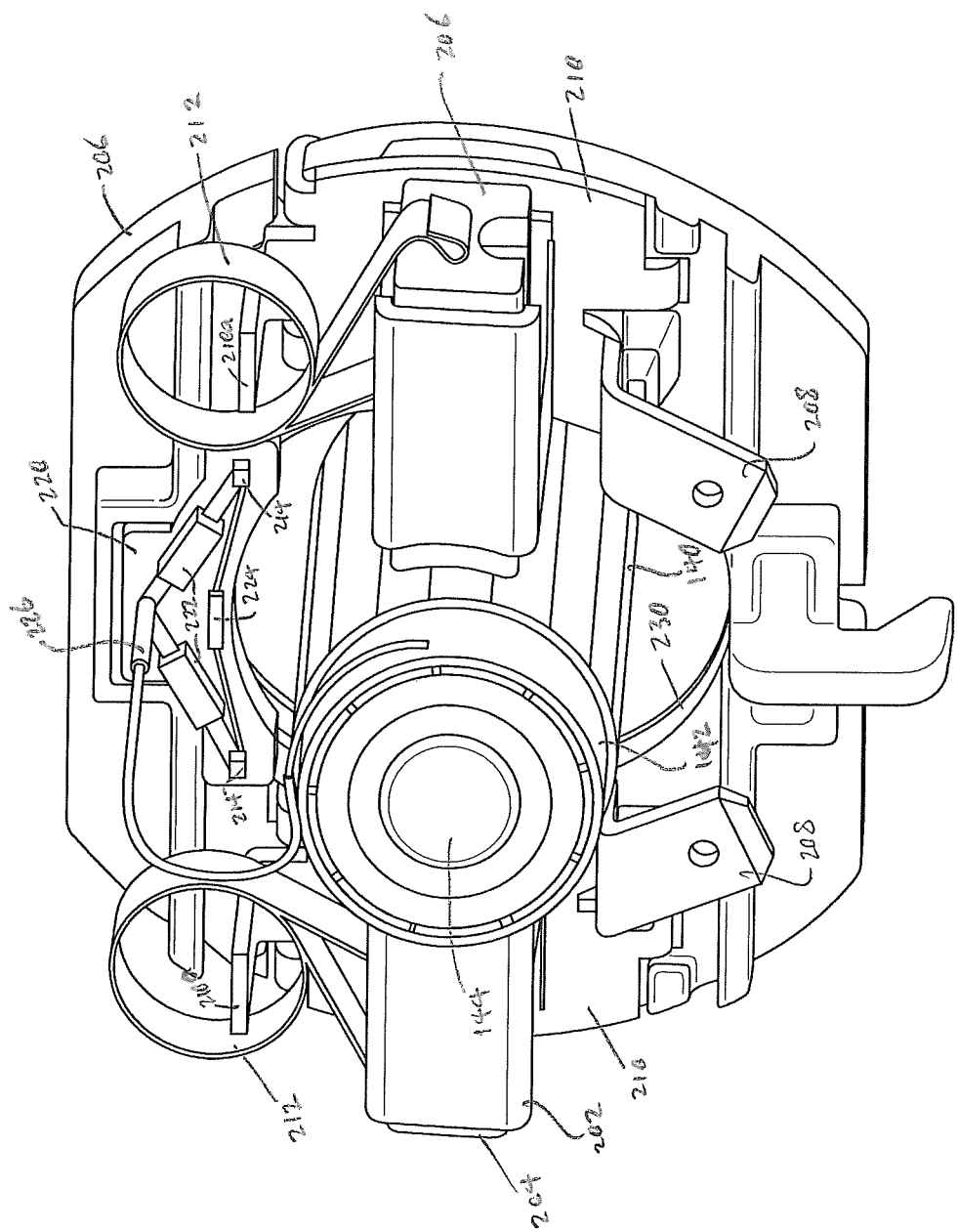
FIG. 4 depicts the brush card of FIG. 2 with the EMI components coupled to a rear bearing of the armature assembly, according to an embodiment.

FIGS. 3 and 4 depict brush cards 106 and 206 of FIGS. 1A and 2, respectively, with the addition of a motor commutator 140 disposed inside the brush card 106 and 206. The commutator 140 may be formed of a series of commutator bars that are energized via brushes 104, 204 to rotate the commutator 140. Commutator 140 is attached to an armature shaft 144, which sits inside a rear end bearing 142. Rear end bearing 142 is often securely housed inside some retaining portion of the motor or tool housing. Rear end bearing 142 prevents the armature shaft 144, the commutator 140, and the rest of the armature assembly from vibrating or moving laterally.

According to a further embodiment of the invention, as depicted in FIGS. 3 and 4, Y capacitors 122, 222 are grounded via wires 126, 226 to rear end bearing 142. Rear end bearing 142 is electrically connected to the armature assembly, which provides a large enough metallic body to provide close to zero potential for grounding the Y capacitors 122, 222. It was found by the inventors listed in this application that coupling Y capacitors 122, 222 to rear end bearing 142 of the motor armature substantially reduces EMI. In an embodiment, wire may be soldered, welded, attached via an adhesive, or simply wrapped around a connection point of the bearing 142 strap.

Figure 5:
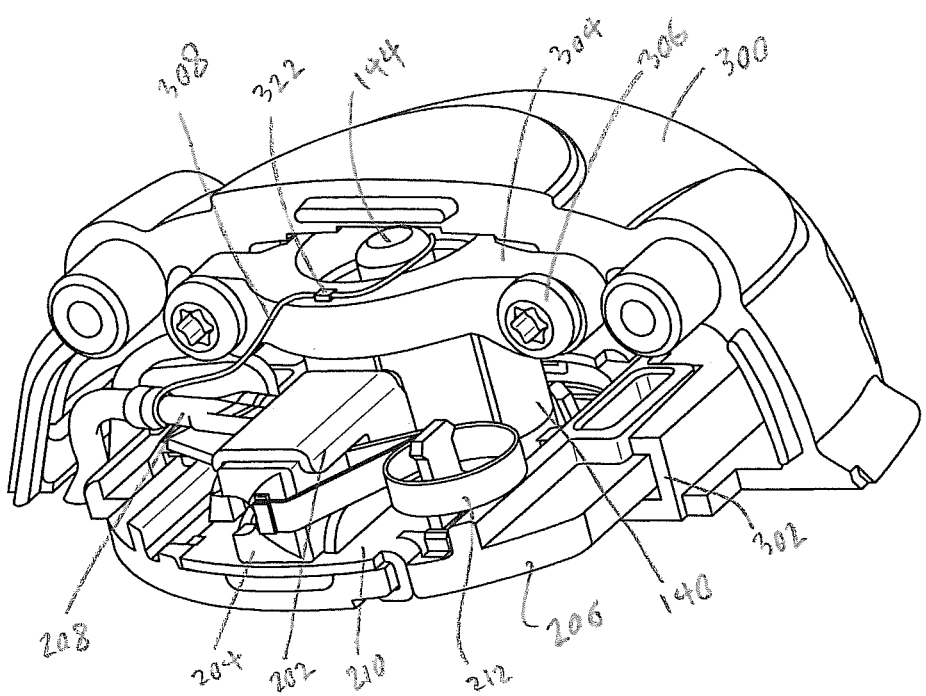
FIG. 5 depicts a partial perspective view of a tool housing and a brush card with the EMI components mounted on a rear bearing retainer, according to an embodiment.

Another aspect of the invention is discussed herein with reference to FIG. 5.

In this figure, brush card 206 (similar to that described in FIG. 2) includes a brush holder 210, a brush 204, a spring 212, a terminal 208, etc. Brush card 206 is secured at an end of a tool housing 300 (which is only partially shown) via one or more ribs 302 of housing 300. Commutator 140 is also shown inside brush card 206. Armature shaft 144 sits inside a rear bearing, which is in turn secured inside a rear bearing retainer (or rear bearing support) 304. The rear bearing is not shown in this figure. Rear bearing retainer 304 is illustratively secured to housing 300 via screws 306. In an embodiment, rear bearing retainer 304 is made of plastic or other insulating material and securely houses the rear bearing. In an embodiment, the rear bearing is heat-staked, pinned or otherwise secured inside the rear bearing retainer 304.

In an embodiment of the invention depicted herein, instead of using a PCB to support EMI components, one or more of the EMI components are mounted on rear bearing retainer 304. In an embodiment, EMI components, for example, two Y capacitors 322 (only one of which is visible) are attached to rear bearing support 304 in the vicinity of brush holder 202 and brush 204. EMI components may be attached to rear bearing retainer 304 via an adhesive. Alternatively, EMI components may be pushed through small holes or slots provided in rear bearing retainer 304. A wire 308 or other electrical connection may be provided between EMI component 322 and terminals 208. Alternatively, EMI component 322 may be directly wired to brush holder 202, brush holder mount 210, brush 204, or spring 212. The other end of EMI component 322 may be electrically coupled to the armature shaft 144 or the armature end bearing (not shown).

It is noted that the X capacitor (not shown) may similarly be attached to rear bearing retainer 304 and electrically connected to the two brushes 204. Alternatively, the X capacitor may be mounted on brush card 206 or a part of housing 300.

Another embodiment of the invention is discussed with reference to FIGS. 6 through 8.

Figure 6:
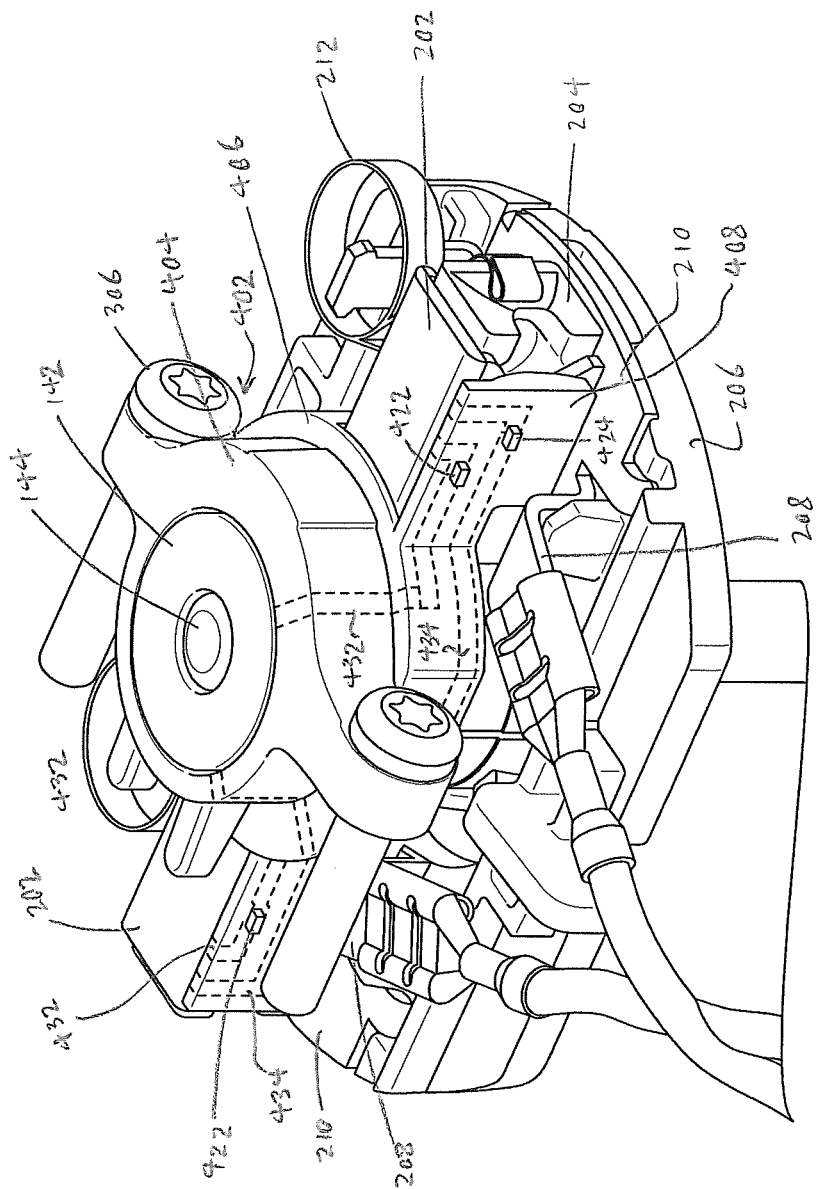
FIG. 6 depicts a rear bearing retainer including EMI components and metal routings for connecting the EMI components to a brush holder and a rear bearing, according to an embodiment.

FIG. 6 depicts a brush card 206 (similar to that described in FIG. 2), including a brush holder 202, a brush 204, a brush holder mount 210, a spring 212, a terminal 208, etc. The brush card 206 is secured at an end of the tool housing (not shown). The armature sits inside a rear bearing 142, which is in turn secured inside a rear bearing retainer assembly 402. Rear bearing retainer assembly 402 is secured to the housing via screws 306.

According to an embodiment of the invention, as shown in FIG. 6, rear bearing retainer assembly 402 includes a bearing retainer 404, which houses and securely holds the rear bearing 142; and an EMI mount portion 406. EMI mount portion 406 extends from a lower end of the bearing retainer 404 to around the commutator. In an embodiment, EMI mount portion 406 substantially encapsulates the commutator between the brushes 204. EMI mount portion 406, in an embodiment, includes walls 408 that extend along the brush holders 202. In the illustrative embodiment of FIG. 6, EMI components (e.g., Y capacitors 422 and X capacitor 424) are mounted on the walls 408 adjacent brush holder 202. Rear bearing retainer assembly 402 includes metal routings (or metal stampings, conductive traces, etc.) 432 and 434 that connect the EMI components to brush holders 202 and rear bearing 142. Specifically, metal routing 432 extends from a back side of wall 408, where it is in contact with brush holder 202. Metal routing 432 also extends from Y capacitors 422 to rear bearing 142 over the rear bearing retainer 404. Similarly, metal routing 434 extends from the back side of wall 408, where it is in contact with brush holder 202, to X capacitor 422 and on to the back side of the other wall 408. In this manner, capacitors 422 and 424 are configured in an X-Y arrangement and are grounded to the rear bearing 142.

In an embodiment, metal routings 432 and 434 are added to rear bearing retainer assembly 402, which is made of plastic or other insulating material, via a plating process. Alternatively or additionally, metal routings 432 and 434 can be insert-molded into the rear bearing retainer assembly 402 to create a combination of mechanical support as well as electrical connection for the EMI components.

Figure 7A:
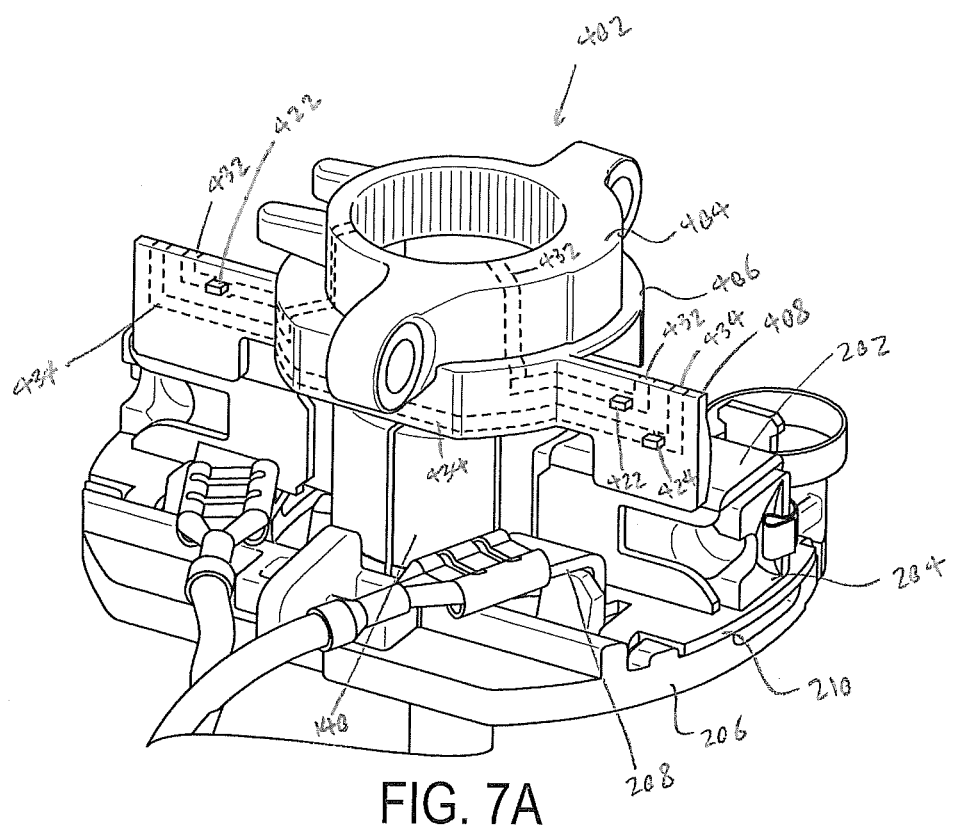
FIGS. 7A and 7B depict front and back perspective views of the rear bearing retainer of FIG. 6 separated from the brush card, according to an embodiment.
Figure 7B:
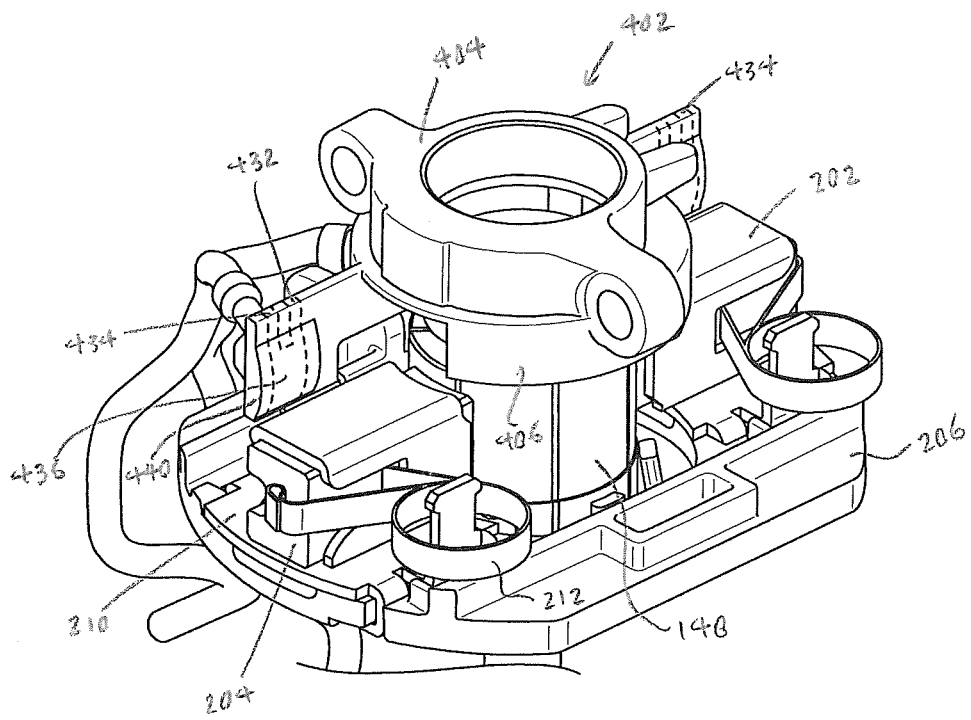

FIGS. 7A and 7B depict front and back views of the rear bearing retainer assembly 402 prior to assembly, according to an embodiment. As shown in these figures, the back side of wall 408 includes a projected contact point 440, which is biased towards and contacts brush holder 202. Metal routings 432 and 434 meet at a contact 436 on the projected contact point 440 to make electric contact with brush holder 202.

Figure 8:
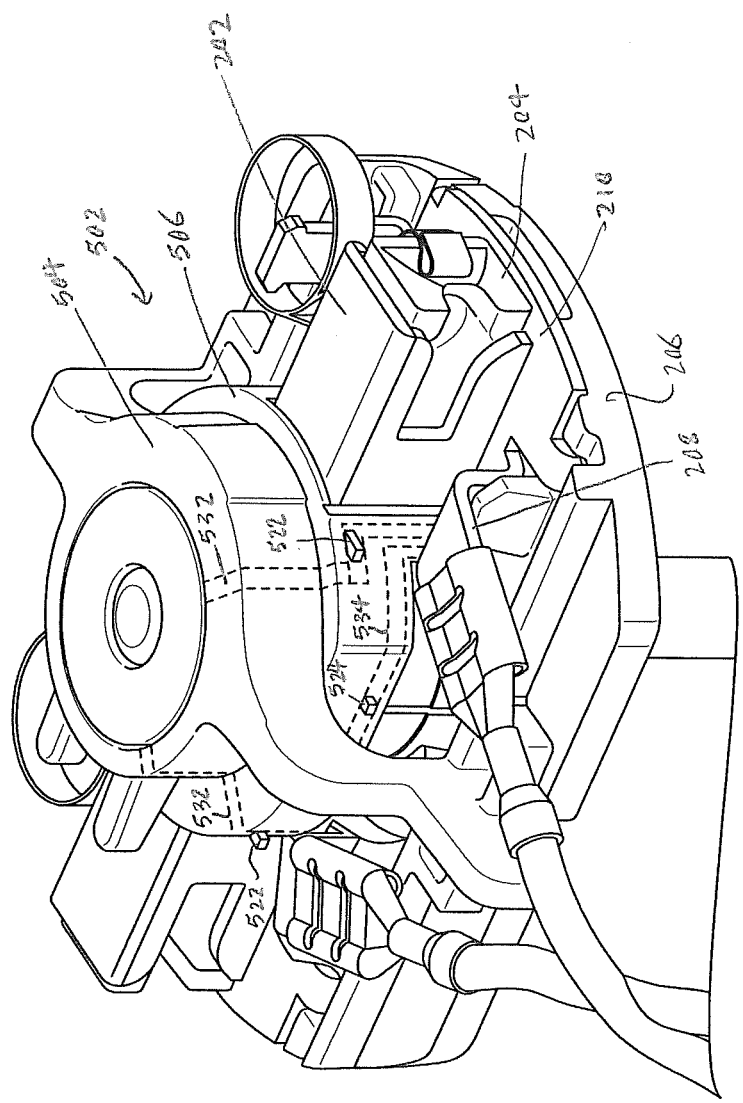
FIG. 8 depicts a rear bearing retainer including EMI components and metal routings for connecting the EMI components to a brush holder mount and a rear bearing, according to an alternative embodiment.

FIG. 8 illustrates an alternative embodiment of rear bearing retainer assembly 502, according to an embodiment. In this embodiment, rear bearing retainer assembly 502 includes a bearing retainer 504, which houses and securely holds the rear bearing 142; and an EMI mount portion 506. However, unlike the previous embodiment, EMI mount portion 506 does not include walls adjacent the brush holder 202. Instead, EMI components 522 (Y capacitors) and 524 (X capacitor) are mounted on the part of EMI mount portion 506 encapsulating the commutator. Metal routings 532 and 534 are routed from EMI components 522 and 534 directly to the brush holder mounts 210, which are electrically connected to brushes 204.

Figure 9A:
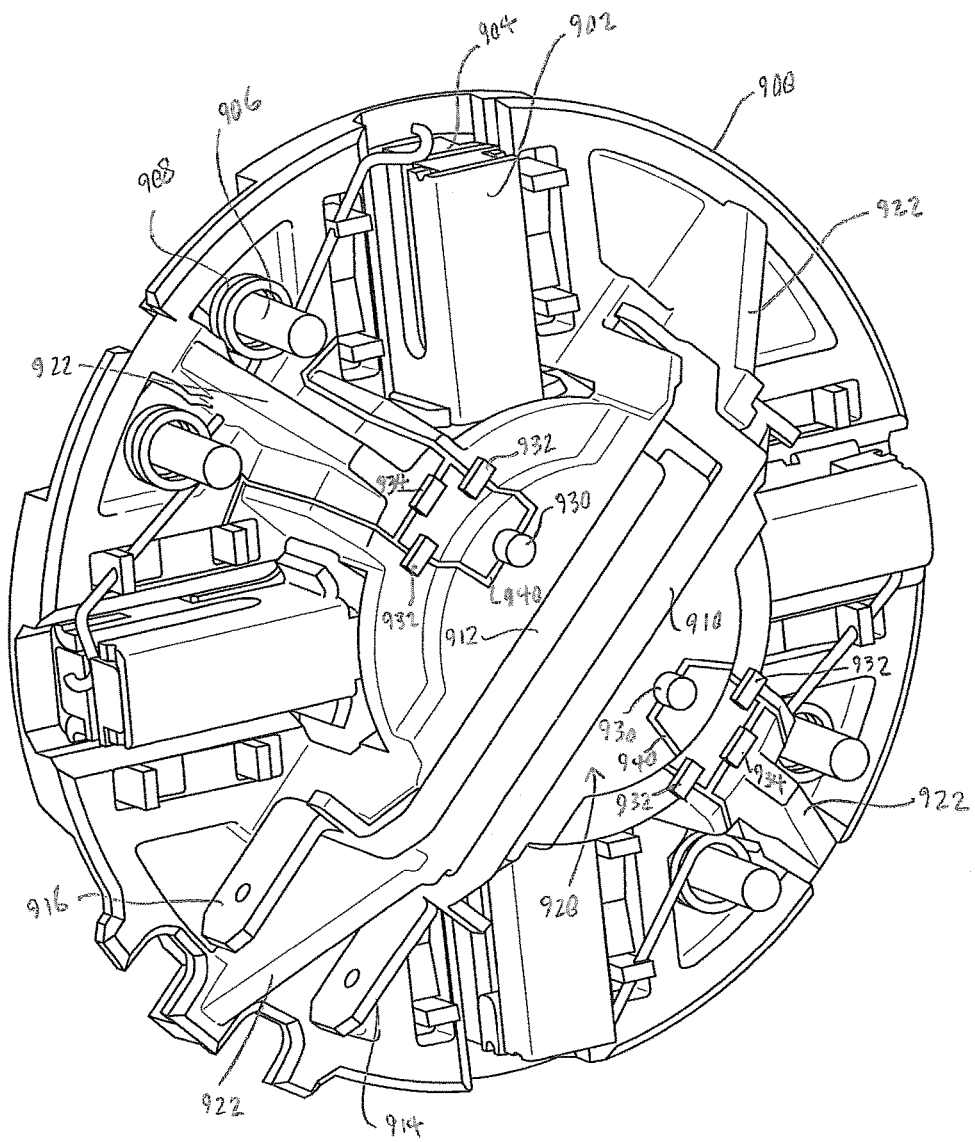
FIGS. 9A and 9B depict front and back perspective views of a four-pole brush card including EMI components.
Figure 9B:
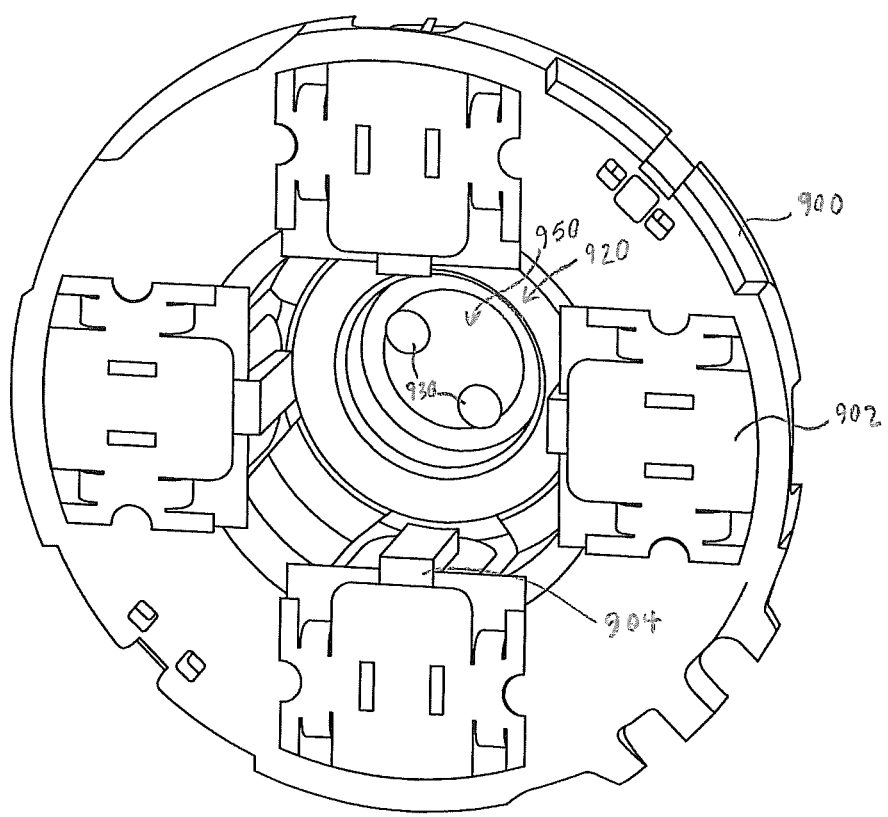

Another aspect of the invention is described herein with reference to FIGS. 9A and 9B.

FIGS. 9A and 9B respectively depict front and back perspective views of a four-pole brush card having EMI components, according to an embodiment. A four-pole motor brush card according to this design is described in detail in Provisional Patent Application No. 61/864,264 filed Aug. 9, 2013, which is incorporated herein in its entirety. In summary, four-pole brush card 900 includes four brush holders 902 housing brushes 904 disposed at 90 degree angles. The brush card 900 includes posts 906 to support springs 908 adjacent each brush holder 902. A bridge cap 920 is supported by four legs 922 of the brush card 900. A motor commutator (not shown) is disposed between the four brushes 904 under the bridge cap 920 and a commutator rear bearing sits within a bearing support 950 on the underside of bridge cap 920. Bridge cap 920 also includes channels for metal routings 910 and 912, which electrically connect opposing brush holders 902. Metal routings 910 and 912 are connected to motor terminals 914 and 916, respectively.

According to an embodiment of the invention, brush card 900 is provided with EMI components such as Y capacitors 932 and X capacitor 934. EMI components may be attached directly on brush card 900, or any other part of the assembly, e.g., legs 922 or bridge cap 920. EMI components are routed to adjacent brush holders 920 via routings 940. The ground terminal of Y capacitors 932 are connected to electrically conductive pins 930 disposed through the bridge cap 920. Pins 930 make electric contact with the metal routings 940 on top of the bridge cap. Pins 930 also contact the rear bearing (not shown) on the underside of the bridge cap 920. This arrangement allows the motor armature assembly to act as a point of zero potential for grounding the Y capacitors 932.

The description of the invention is merely exemplary in nature and, thus, variations that do not depart from the gist of the invention are intended to be within the scope of the invention. Such variations are not to be regarded as a departure from the scope of the invention.

The invention claimed is:

1. A power tool comprising:
a housing;
an electric motor disposed within the housing, the electric motor including a stator and an armature rotatably received within the stator, the armature having an armature shaft on which a commutator is mounted;
a brush assembly disposed around the commutator, the brush assembly including a brush card having a through-hole through which the commutator is disposed, two brush holder mounts mounted on a mounting surface of the brush card around the through-hole, two brush holders attached to the brush holder mounts and housing at least two brushes in contact with the commutator, and a circuit board mounted on the brush assembly and in electrical contact with the brushes,
wherein the brush holder mounts each include a pin upwardly-projecting from a surface thereof perpendicularly to the mounting surface of the brush card,
the circuit board having at least one electromagnetic interference (EMI) suppression component electrically mounted thereon and two through-holes through which the pins of the brush holders are received, wherein the circuit board is physically secured between the two brush holders over the mounting surface of the brush card via the pins of brush holders, the EMI suppression component being electrically coupled to the brushes via the two pins.

2. The power tool of claim 1, wherein the at least one EMI suppression component comprises an X capacitor having terminals electrically coupled to the two brushes and two Y capacitors having first terminals electrically coupled to the two brushes and second terminals electrically coupled to a point of substantially zero potential.

3. The power tool of claim 2, wherein one end of the armature shaft is housed within a rear bearing and the second terminals of the Y capacitors are electrically coupled to the rear bearing so as to ground the Y capacitors to the armature.

4. The power tool of claim 3, further comprising a wire extending from the second terminal of the Y capacitors to the rear bearing.

5. The power tool of claim 1, wherein the brush assembly comprises a pair of spring arms extending around the commutator, the brushes being attached to a first end of the spring arms, the second end of each spring arm including an electrically conductive post to which the circuit board is secured, the posts providing electrical connection between the EMI suppression component and the spring arms.

6. The power tool of claim 1, wherein the brush assembly comprises a pair of brush holders housing the brushes, the brush holders including an electrically conductive post to which the circuit board is secured, the posts providing electrical connection between the EMI suppression component and the brush holders.

* * * * *